July 11, 1950 E. F. YENDALL 2,514,921
PROCESS AND APPARATUS FOR SEPARATING GAS MIXTURES
Filed Nov. 16, 1944
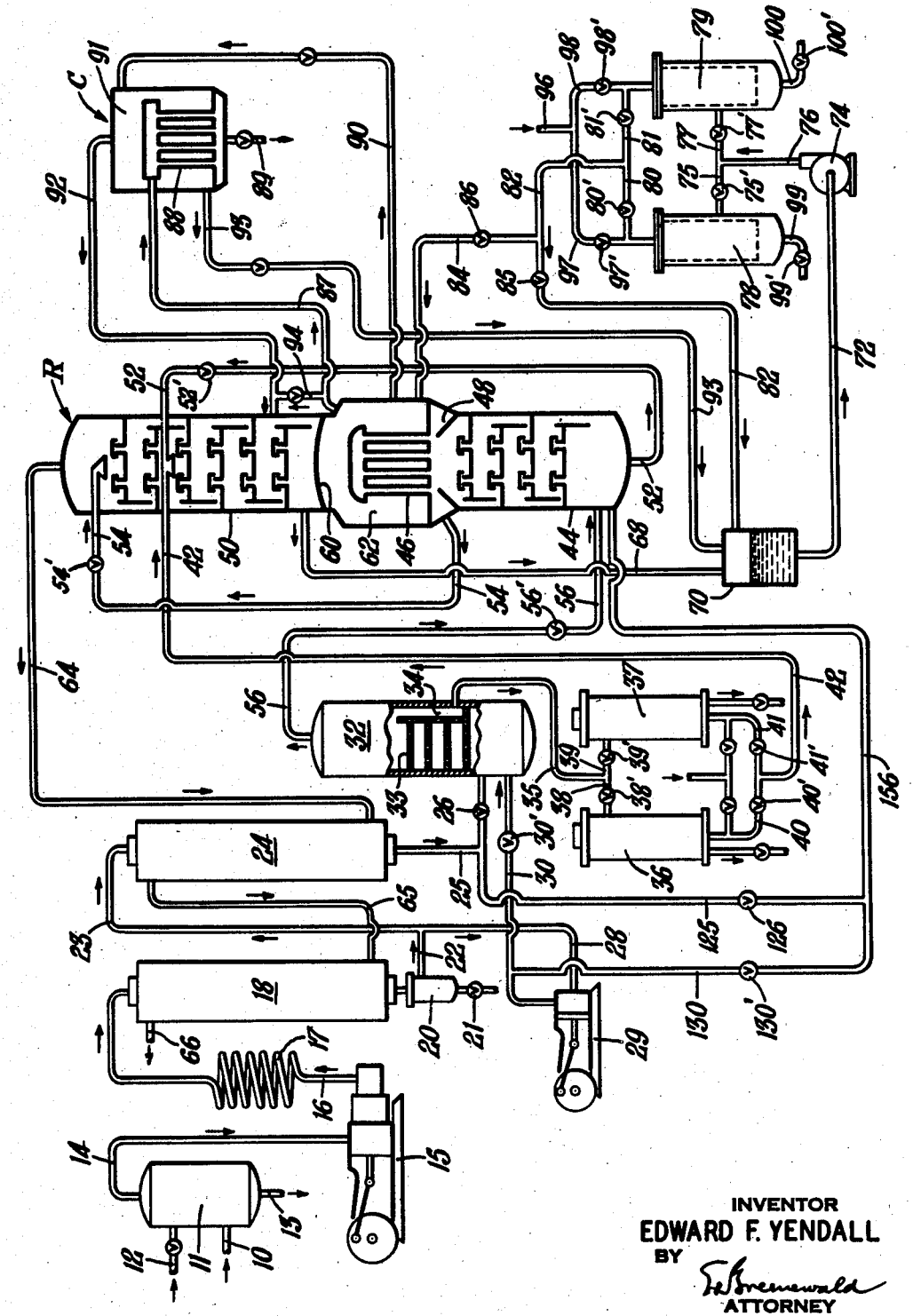
INVENTOR
EDWARD F. YENDALL
BY
ATTORNEY Patented July 11, 1950

2,514,921

UNITED STATES PATENT OFFICE 2,514,921

PROCESS AND APPARATUS FOR
SEPARATING GAS MIXTURES

Edward F. Yendall, Kenmore, N. Y., assignor to
The Linde Air Products Company, a corporation of Ohio Application November 16, 1944, Serial No. 563,779

18 Claims. (Cl. 62—175.5)

This invention relates to the separation of components of gas mixtures and more especially it concerns a process and apparatus for eliminating higher boiling point impurities such as carbon dioxide, hydrocarbons, etc., during or prior to the separation of gas mixtures such as air by low temperature rectification.

Heretofore, in the separation of air by low temperature rectification processes, difficulties normally have arisen as a result of the presence in the air of hydrocarbons and other impurities which tend to accumulate and become concentrated in portions of the rectification apparatus, and particularly in those portions of the apparatus where the oxygen is produced and isolated, at which points the presence of hydrocarbons constitutes a serious industrial hazard.

Various attempts have been made to minimize these hydrocarbon accumulations by separating such impurities from the liquid oxygen. Attempts also have been made to prevent entry of the impurities into the lower pressure stage of rectification by filtering the liquid being transferred from a higher pressure stage to a lower pressure stage of rectification. Another procedure involves the use of an auxiliary condenser having a condensing head disposed within a vaporizing chamber, and having a condensate chamber at its lower end. The impurity-free vapors produced in the vaporizing chamber of the auxiliary condenser flow from the top of the latter to an intermediate part of a low pressure rectifying column. Periodically the production operation is discontinued, and accumulated hydrocarbons and other solid impurities are withdrawn from the auxiliary condenser through a suitable drain connection. Nevertheless, the heat-exchange surfaces of the auxiliary condenser gradually collect carbon dioxide, hydrocarbons, and other solid impurities to an extent such that the heat transfer efficiency of the auxiliary condenser eventually is seriously impaired. Furthermore, the high concentration of such impurities sometimes has resulted in these impurities being carried over in the vapors flowing to the rectifying column.

Among the more important objects of this invention are the following: to provide a novel process and apparatus for preventing or retarding the undue accumulation of hydrocarbons and other solid impurities in elements of a gas separation plant wherein concentration or rectification of components of gas mixtures is being conducted at low temperatures; to provide in novel manner for eliminating or reducing the loss in production capacity caused by the use in the usual manner of an auxiliary condenser in conjunction with rectifying apparatus; and to provide for accumulating hydrocarbons and other solid impurities within a zone external to and remote from the rectifying apparatus and auxiliary condenser, so as to minimize the damage and loss of production capacity in the event of flashing of such impurities in the presence of high purity oxygen.

In the practice of a preferred modification of the invention for the separation of air, the latter is compressed and cooled in the usual manner while under pressure to a low temperature. A portion of the cooled air is liquefied upon expansion to a lower pressure. All of the cooled air preferably is then thoroughly scrubbed with liquefied portions of the air at a lower pressure. The solid impurities are retained by the liquid fraction, and the impurity-free gaseous fraction may be passed directly to the lower portion of a high pressure zone of a two-stage rectifying column. The liquid fraction of the air, which contains the solid impurities, may be filtered by passing it through one of a pair of duplicate filters. The solid carbon dioxide and hydrocarbons collect on the filters. The filtered liquid fraction then may be passed directly into a low pressure rectifying zone or column. The aforesaid scrubbing of the air and the filtration of the liquid fraction of the scrubbed air may be dispensed with if desired, the cooled and partly liquefied air being then passed directly into a rectifying column.

It is a distinguishing and important feature of the invention that a residual liquid rich in oxygen is withdrawn from the lower portion of the rectification column or zone in which the main rectification occurs and is conducted to a storage reservoir from whence it is forced through a filter, or one of a pair of filters, by means of a suitable pump, thereby removing any solid impurities present in the liquid as a result of the evaporation of portions of the liquid. The resultant filtered high-purity liquid oxygen then is forced under pressure into the vaporizing chamber of a main condenser which conveniently may be operated at around 6 to 8 pounds per square inch above the pressure existing in the rectifying column. In the said vaporizing chamber the liquid is evaporated by heat exchange with condensing gases of lower oxygen content from a rectifying column or a chamber operating under a higher pressure. The resultant oxygen vapors, free from solid impurities, are conducted to the condenser tubes of an auxiliary condenser, and there are condensed by heat exchange with a colder fluid, preferably liquid oxygen withdrawn from the main condenser and being vaporized under a pressure about equal to the pressure of the low pressure rectifying column or zone with which the vaporizing chamber of the auxiliary condenser is in communication.

Thus it will be understood that the pressure initiated at the pump is employed to facilitate operation of the auxiliary condenser evaporating compartment under a pressure approximately that of the low pressure rectifying column, while the main condenser high purity oxygen evaporating compartment may be operated at somewhat higher pressures made possible by use of the pump.

The accompanying drawing illustrates one preferred modification of the invention that is especially useful for plants making liquid oxygen. Various cycles for the refrigeration and partial liquefaction of the air can be employed; and any of the customary procedures may be used for drying the air. However, in the modification shown, the air entering the unit through inlet 10 preferably is washed with water in a scrubber 11, supplied at its upper end with water through a valve-controlled line 12, the water leaving through line 13. Other means for cleaning the air may be substituted. The air then passes through conduit 14 into the low pressure cylinder of a multistage air compressor 15 wherein the air is compressed to a high pressure which may be as much as 3,000 pounds per square inch. The compressed air leaves the compressor through pipe 16 having therein an after cooler 17, and passes through the high pressure tubes of a heat exchanger 18. The lower ends of the high pressure tubes communicate with a trap 20 which collects water condensed in exchanger 18. The latter may be so operated that the air is cooled to a temperature near but not below 0° C. to avoid the freezing of water. Water may be periodically blown from trap 20 through valve 21. The air leaves the trap 20 through conduit 22 having branch lines 23 and 28. Conduit 23 conducts a large portion of the air to the upper header of a main continuous countercurrent heat exchanger 24. A conduit 25 having therein an expansion valve 26 conducts the cold air containing particles of solid carbon dioxide and hydrocarbons from heat exchanger 24 into the lower portion of a scrubber-separator 32. Valve 26 may be used to reduce the pressure of the air to that of scrubber 32 which may, for example, be substantially that existing in the high pressure stage of rectification or somewhat higher. A portion of the air is liquid at the pressure of scrubber 32.

Preferably a substantial portion of the air leaving the trap 20 through line 22 is conducted through branch line 28 to an expansion engine 29 wherein the air is expanded to the pressure of the scrubber 32 and, due to the production of external work, the temperature of the air is reduced to a very low value. The expanded air is then conducted to the scrubber 32 through conduit 30, a stop valve 30' therein being open.

The scrubber 32 is provided with gas and liquid contact means, which preferably comprise a series of perforated plates disposed above the inlet conduits 25 and 30 and extending upward for a short portion of the scrubber, leaving a large vapor space above the plates to prevent loss of liquid by entrainment in the gases. An overflow chamber 34 maintains the liquid level slightly above the upper plate 33.

The gaseous fraction leaves the scrubber through conduit 56 and flows to the lower portion of a relatively high pressure chamber 44 of a rectifying column R, which chamber may function under a pressure of around 100 pounds per square inch.

The liquid fraction containing solid carbon dioxide and hydrocarbon impurities is conducted from the scrubber 32 through conduit 35 to one of a pair of filters 36, 37. These filters conveniently may be similar to the filters 42, 43, described in United States Patent No. 2,337,474 of H. C. Kornemann and E. F. Yendall. Conduit 35 has two branches 38, 39, controlled by valves 38', 39', connecting with the filters. The filtered liquid leaves the filters through the branch lines 40 and 41, controlled by the valves 40', 41', and the main conduit 42 which conducts the filtered liquid to a mid-portion of a relatively low pressure chamber 50 of the rectifying column R, which chamber may function under a pressure around 6 to 8 pounds per square inch.

The rectifying column R, in the form shown, comprises a lower rectifying column 44 and an upper rectifying column 50. A main condenser 46 is located intermediate the upper and lower rectifying columns. The condenser and said upper column 50 are not in direct unrestricted communication, being separated by a solid diaphragm such as the plate 60. The upper end of column 44 communicates with the interior of the tubes of condenser 46; and the former has a liquid collecting shelf 48 disposed immediately below the condenser. An oxygen evaporation chamber 62 surrounds condenser 46, and may function under a pressure around 15 pounds per square inch.

Oxygen-containing liquid collecting at the lower end of column 44 is transferred by a conduit 52 controlled by a valve 52' to an intermediate portion of the upper column 50. Liquid high in nitrogen collects at the shelf 48 and is transferred to the upper end of column 50 through conduit 54 controlled by a valve 54', to provide a further reflux liquid for that column.

The nitrogen product of the separation flows from the top of the upper column 50 through a conduit 64 to the lower end of main heat exchanger 24, and thence through the latter in countercurrent indirect heat exchange relation with the high pressure air in the exchanger tubes. The nitrogen leaves exchanger 24 through conduit 65 which conducts it to the lower end of heat exchanger 18. The nitrogen leaves the latter through conduit 66.

Except for the arrangement of the condenser chamber 62, the apparatus thus far described is similar to that disclosed in the aforesaid Patent No. 2,337,474.

The impurity-containing oxygen-rich liquid collecting in the lower portion of the upper rectifying column 50 is withdrawn through conduit 68 and conducted to a reservoir 70 for the liquid. The lower portion of the reservoir is connected through conduit 72 with the inlet of a liquid oxygen pump 74, which may be similar to that described in United States Patent No. 2,340,787 of G. H. Zenner and E. F. Yendall. The pump 74 forces the liquid through conduit 76 and branches 75, 77, controlled by valves 75', 77', into and through one of a pair of filters 78, 79, similar to the filters 36, 37. From the filters 78, 79, the pump forces the filtered liquid oxygen, now free from solid impurities, through a corresponding conduit 80, 81, controlled by one of the valves 80', 81', and through branch lines 82 and 84, controlled by valves 85 and 86, and into the lower portion of chamber 62 around the tubes of condenser 46. A portion of the filtered oxygen is there vaporized, and is conducted through conduit 87 to the heat exchanger tubes 88 of an auxiliary condenser C, where it is condensed and the high purity liquid oxygen product withdrawn from the system through valve-controlled conduit 89.

The residual filtered liquid oxygen, in which any solid impurities present have been concentrated, is continuously withdrawn from chamber 62 and conducted through valve-controlled conduit 90 to the vaporizing compartment 91 of the auxiliary condenser C, where it is vaporized by heat exchange with the oxygen being condensed in condenser tubes 88. The vapors from compartment 91 flow through conduit 92 to the lower portion of column 50. Any residual unvaporized liquid, which will retain any residual hydrocarbons and/or other solid impurities, may be conducted from the compartment 91, either continuously or intermittently, through valve-controlled conduit 93 to the reservoir 70, and thence to one of the filters 78, 79.

Portions of the oxygen vapors formed in the evaporating chamber 62 are conducted through valve-controlled conduit 94, and the connecting portions of conduits 87 and 92, into the lower end of the rectifying column 50.

Either filter 78 or 79 may be purged of solid impurities, when desired, by closing valves 75', 80', or 77', 81', and passing nitrogen, which may have been previously heated, through a conduit 96 to one of two branches 97, 98, controlled by valves 97', 98', and thence into the corresponding filter. The nitrogen and gasified impurities leave the filter through a corresponding waste conduit 99 or 100, controlled by valves 99' or 100'. Thus, if it is desired to thaw out the filter 78, valves 75' and 80' are closed, and valves 97' and 99' are opened. A stream of warm dry nitrogen then flows from conduit 96 to the interior of the filter, through the filter element of porous ceramic material or porous metal, and then out through line 99. Substantially all of the solid impurities collected on the filter are vaporized and blown out. When the purged filter is to be returned to service it preferably is cooled gradually by opening valve 75' slightly to allow a small flow of liquid through the filter, the resultant vapors being purged through line 99. When the filter 78 is sufficiently cool, valve 99' is closed and valve 80' opened.

By the use of the pump 74, and the valves in conduits 82, 84, 89, 90, 93 and 94, the evaporating chamber 62 may be operated at a pressure around 6 to 8 pounds per square inch above the pressure in the upper column 50. Thus, oxygen is vaporized under pressure in chamber 62, and later is condensed in condenser 88, refrigeration for the purpose being supplied by the boiling of oxygen entering chamber 91 through conduit 90 and under the lower pressure of the column 50.

By regulation of valves 85 and 86, any selected portion of the liquid passing through the filters 78, 79 may be recycled through the reservoir 70 and filters to insure that the liquid oxygen level in chamber 62 shall be maintained at the proper level for most efficient heat transfer from condenser 46.

In certain instances it may be desirable to effect a preliminary removal of a large portion of the carbondioxide of the air to be processed by chemical treatment of the air prior to or during compression and, in such instances, the scrubber-separator 32 and filters 36 and 37 may be omitted or by-passed. For by-passing the scrubber and filters, a branch 130 of conduit 30 is provided to conduct the expanded air from engine 29 to a conduit 156 which conducts the air to the high pressure chamber 44. Also a branch 125 of conduit 25 and provided with an expansion valve 126 conducts the cooled high pressure air to be throttle expanded from conduit 25 to the conduit 156. To isolate the scrubber and filters, a stop valve 130' in branch 130 is opened, valve 126 is regulated, valves 30' and 26 are closed, and a stop valve 56' interposed in conduit 56 is closed. Valves 40' and 41' may also be closed. No liquid fraction then flows to the upper chamber 50 but all the oxygen containing liquid is collected in the high pressure chamber 44 and transferred to the upper chamber 50, for rectification therein, by conduit 52 which is provided with an expansion valve 52'.

It will be seen therefore that the improved impurity separating arrangement according to the invention may be applied to various types of gas separation plants to avoid accumulation of undesirable amounts of filterable impurities in the rectifying apparatus and to prevent such impurities from appearing in the desired liquefied gas product of the separation. Such result is accomplished whether or not a preliminary separation of the impurities is practiced prior to rectification, or whether or not the rectification is effected in a single stage or in two stages. Any impurities that may reach the final rectification chamber 50 are eliminated by filtering the liquid product of such rectification and only filtered liquid is evaporated in the condenser chamber 62. Any impurities which become concentrated and filterable due to the vaporization occurring in chamber 62 are carried out by the stream of liquid passed by conduit 90 to the auxiliary evaporation chamber 91 and the residue of such second evaporation, which includes the further filterable impurities, is recirculated through the filters 78 or 79.

Where desired, a valve-controlled conduit (not shown) may directly connect the lower portion of evaporation chamber 62 with the inlet of pump 74. Liquid oxygen may be withdrawn from chamber 62, filtered in one of the filters 78, 79, and the filtered liquid returned to chamber 62. This arrangement helps to prevent the concentration of solid impurities in that chamber. Liquid oxygen containing solid impurities precipitated therein by the evaporation of portions of the oxygen in chamber 91 is conducted therefrom through conduit 93 to the reservoir 70 and thence to a filter.

It will be seen that residual or concentrated liquids of high oxygen content resulting from the evaporation of liquids in chambers 62 and 91, and in the lower portion of column 50, respectively, are filtered, and any solid impurities present therein removed, before being further evaporated whereby concentration of the impurities can again occur. The solid impurities thus are segregated and collected as rapidly as formed; and this is done in elements of simple design which can be disconnected readily from the other elements of the system preparatory to the elimination of such impurities. This prevents the accumulation of hydrocarbons in massive and complex elements of the unit that might be seriously injured by flashing of hydrocarbons or the like.

The invention has been specifically described in connection with the separation of the components of air to produce oxygen and nitrogen. However, the principles thereof are not limited to such use, but are applicable to the low temperature separation of other gas mixtures containing carbon dioxide and/or hydrocarbons such, for example, as coke oven gases.

Obviously various modifications may be made without departing from the spirit of the invention as herein described and claimed.

I claim:

1. In a process for the elimination of high boiling impurities during the separation of a gas mixture by low temperature rectification in stages, the steps comprising withdrawing from the last stage of rectification a liquid rich in a higher boiling point component of said mixture and containing said impurities mainly in the solid state, filtering said withdrawn liquid to remove impurities in the solid state, vaporizing the filtered liquid, and returning the vapors thereof to said last stage of rectification.

2. In a process for the elimination of high boiling impurities during the separation of a gas mixture by low temperature rectification in stages, the steps comprising withdrawing from the last stage of rectification a liquid rich in a higher boiling point component of said mixture and containing said impurities mainly in the solid state, filtering said withdrawn liquid to remove impurities in the solid state, and vaporizing the filtered liquid in a vaporizing operation under a pressure higher than that of said last stage of rectification.

3. In a process for the elimination of high boiling impurities during the separation of a gas mixture by low temperature rectification in stages, the steps comprising withdrawing from the last stage of rectification a liquid rich in a higher boiling point component of said mixture and containing said impurities mainly in the solid state, filtering said withdrawn liquid to remove impurities in the solid state, vaporizing a portion of the resultant filtered liquid in a vaporizing operation under a pressure higher than that of said last stage of rectification, vaporizing a second portion of said filtered liquid in a vaporizing operation under approximately the pressure of said last stage of rectification by heat exchange with vapors resulting from the vaporization of said first-named filtered liquid portion, withdrawing and filtering a liquid residue from the last-named vaporization, and returning such filtered residue to said first vaporizing operation.

4. In a process for the elimination of high boiling impurities during the separation of a gas mixture by low temperature rectification in stages, the steps comprising withdrawing from the last stage of rectification a liquid rich in a higher boiling point component of said mixture and containing said impurities mainly in the solid state, filtering said withdrawn liquid to remove impurities in the solid state, vaporizing a selected portion of the filtered liquid under the pressure of the last stage of rectification thereby concentrating further portions of impurities in a liquid residue of said vaporization, filtering said liquid residue and returning the filtered residue to said vaporization.

5. In a process for the elimination of high boiling impurities during the separation of air by rectification at low temperatures, which includes the steps of separating compressed cooled air into a gaseous fraction which is rectified in an operation under a relatively high pressure and a liquid fraction containing solid and dissolved impurities that is expanded, filtered and rectified in a second rectifying operation under a relatively low pressure, the improvement which comprises the steps of concentrating solid impurities in an oxygen-rich liquid in said second rectifying operation, filtering said liquid, thereafter vaporizing a portion of the filtered liquid in a vaporizing operation under a pressure of about 5 to 10 pounds per square inch above said low pressure, thereby forming a liquid oxygen residue containing solid impurities, reducing the pressure of the liquid oxygen residue from that of said vaporizing operation to said low pressure, passing the impurity-free oxygen vapors in indirect heat exchange with the liquid oxygen residue from said vaporizing operation, thereby condensing the impurity-free oxygen vapors and further concentrating impurities in said liquid oxygen residue under said low pressure, filtering the thus concentrated liquid oxygen residue, vaporizing the oxygen from the last-named filtered residue, and recovering the oxygen.

6. In a process for the elimination of high boiling impurities during the separation of air by rectification at low temperatures including rectifying compressed cooled and partly liquefied air in a rectifying operation under a relatively low pressure, the improvement which comprises withdrawing oxygen-rich liquid product containing solid impurities from the low pressure rectifying operation, filtering such liquid to remove impurities therefrom, vaporizing a portion of the thus filtered liquid in a vaporizing operation maintained under a pressure of about 5 to 10 pounds per square inch higher than the pressure in the low pressure rectifying operation, vaporizing another portion of said filtered liquid in a second vaporizing operation maintained at about the pressure of said rectifying operation, filtering the residual liquids from each of said vaporizing steps, and returning the thus filtered liquids to the first-named vaporizing operation.

7. In a process for the elimination of high boiling impurities during the separation of air by rectification at low temperatures, which includes the steps of separating compressed cooled air into a gaseous fraction which is rectified in an operation under a relatively high pressure and a liquid fraction containing solid and dissolved impurities that is expanded, filtered, and rectified in a second rectifying operation under a relatively low pressure, the improvement which comprises withdrawing oxygen-rich liquid containing solid impurities from the low pressure rectifying operation, filtering the liquid, vaporizing a portion of the filtered liquid in a vaporizing operation maintained under a pressure of from 5 to 10 pounds per square inch higher than the pressure in said low pressure rectifying operation, vaporizing another portion of said filtered liquid in a second vaporizing operation maintained at about the pressure of said second rectifying operation by heat exchange with oxygen vapors formed in the first-named vaporizing operation, recovering the purified liquid oxygen thereby produced, filtering the residual liquids from each of said vaporizing steps, and returning the thus filtered liquid to the first-named vaporizing operation.

8. Process for the elimination of high boiling impurities during the separation of air by rectification at low temperatures, which comprises subjecting compressed cooled air to rectification in a first rectifying operation under a relatively high pressure and in a second rectifying operation under a relatively low pressure, withdrawing oxygen-enriched liquid containing solid impurities from said second rectifying operation and vaporizing a portion of such liquid in a first vaporizing operation under a pressure intermediate the pressures in the respective rectifying operations, vaporizing a portion of the liquid remainder containing solid impurities from the first vaporizing operation in a second vaporizing operation by indirect heat exchange with vapors formed in said first vaporizing operation, thereby concentrating solid impurities in the liquid residue in said second vaporizing operation, and removing solid impurities from said liquid withdrawn from said second rectifying operation and from said liquid residue from said second vaporizing operation, and returning the purified liquids to said first vaporizing operation.

9. Process as defined in claim 8 wherein said second vaporizing operation is conducted under a pressure lower than the pressure of said first vaporizing operation.

10. Process as defined in claim 8 wherein the second vaporizing operation is conducted under substantially the same pressure as said second rectifying operation.

11. Apparatus for the elimination of solid impurities from gas mixtures containing the same during low temperature separation of such gas mixtures by rectification, which comprises a low pressure rectifying column; a main vaporizer-condenser having a vaporizing chamber and a condensing chamber; an auxiliary vaporizer-condenser having a vaporizing chamber in restricted communication with the lower part of the vaporizing chamber of the main vaporizer-condenser and having a condensing chamber in free communication with the vaporizing chamber of the main vaporizer-condenser; a filter; means for forcing liquid through said filter; means for conducting to said forcing means liquid from the low pressure rectifying column; and means for conducting the filtered liquid to the vaporizing chamber of said main vaporizer-condenser.

12. Apparatus for the elimination of solid impurities from gas mixtures containing the same during low temperature separation of such gas mixtures by rectification, which comprises a low pressure rectifying column; a main vaporizer-condenser having a vaporizing chamber and a condensing chamber; an auxiliary vaporizer-condenser having a vaporizing chamber in restricted communication with the lower part of the vaporizing chamber of the main vaporizer-condenser and having a condensing chamber in free communication with the vaporizing chamber of the main vaporizer-condenser; a pressure filter; means for forcing liquid through said filter; means for conducting liquid containing solid impurities to said forcing means from the vaporizing chamber of said auxiliary vaporizer-condenser; and means for conducting the filtered liquid to the vaporizing chamber of said main vaporizer-condenser.

13. Apparatus for the elimination of solid impurities from gas mixtures containing the same during low temperature separation of such gas mixtures by rectification, which comprises a low pressure rectifying column; a main vaporizer-condenser having a vaporizing chamber and a condensing chamber; an auxiliary vaporizer-condenser having a vaporizing chamber in restricted communication with the lower part of the vaporizing chamber of the main vaporizer-condenser and having a condensing chamber in free communication with the upper part of the vaporizing chamber of the main vaporizer-condenser; a pressure filter; a liquefied gas pump for forcing liquid rich in one component of said mixture through said filter and for forcing the filtered liquid to the vaporizing chamber of said main vaporizer-condenser; and means for conducting liquid containing solid impurities to the inlet of said pump from the vaporizing chamber of said auxiliary vaporizer-condenser and from said low pressure rectifying column, respectively.

14. Apparatus for the elimination of solid impurities from gas mixtures containing the same during low temperature separation of such gas mixtures by rectification, which comprises a rectifying column; a main vaporizer-condenser having a vaporizing chamber and a condensing chamber; an auxiliary vaporizer-condenser having a vaporizing chamber and a condensing chamber; means connecting the vaporizing chamber of the main vaporizer-condenser with the condensing chamber of the auxiliary vaporizer-condenser; means providing restricted communication between the lower part of the vaporizing chamber of the main vaporizer-condenser and the vaporizing chamber of said auxiliary vaporizer-condenser; a filter; means for withdrawing liquid containing solid impurities from the rectifying column, for forcing the liquid through said filter, and for conducting the filtered liquid to the vaporizing zone of the main vaporizer-condenser; and means for maintaining within the vaporizing chamber of said main vaporizer-condenser a pressure higher than that in said rectifying column.

15. Apparatus for the elimination of solid impurities from gas mixtures containing the same during low temperature separation of such gas mixtures by rectification, which comprises a rectifying column; a main vaporizer-condenser having a vaporizing chamber and a condensing chamber; an auxiliary vaporizer-condenser having a vaporizing chamber and a condensing chamber; means connecting the vaporizing chamber of the main vaporizer-condenser with the condensing chamber of the auxiliary vaporizer-condenser; means providing restricted communication between the lower part of the vaporizing chamber of the main vaporizer-condenser and the vaporizing chamber of said auxiliary vaporizer-condenser; a filter; means for withdrawing liquid containing solid impurities from the lower portion of the vaporizing chamber of said auxiliary vaporizer-condenser and for forcing the liquid through said filter; means for conducting the filtered liquid to the vaporizing zone of said main vaporizer-condenser; and means for maintaining in the last-named zone a pressure higher than that in the vaporizing chamber of said auxiliary vaporizer-condenser.

16. Apparatus for the production of liquid oxygen free from solid impurities, which comprises a rectification column having an inlet near the upper end for introducing an oxygen-rich liquid containing hydrocarbon impurities, and having an inlet near the lower end for introducing an oxygen-containing gas; an oxygen vaporizing chamber separated from said rectification column; a condenser within and spaced from the walls of said chamber; means for withdrawing liquid oxygen containing impurities from the lower portion of said vaporizing chamber; means for returning filtered liquid oxygen to that chamber; and an oxygen pump and a filter respectively operatively connected between said withdrawing means and returning means.

17. Apparatus for the production of liquid oxygen free from solid impurities, which comprises an air rectification column including a high pressure chamber, a low pressure rectifying chamber and an oxygen vaporizing chamber with a condenser therein in heat exchange relation to said high pressure chamber, said low pressure chamber having an inlet for the introduction of oxygen-rich liquid containing hydrocarbon impurities transferred from said high pressure chamber, said high pressure chamber having an inlet for introducing an oxygen containing gas carrying impurities; means for withdrawing liquid oxygen containing impurities from the lower portion of said vaporizing chamber; means for returning filtered liquid oxygen to said vaporizing chamber; and an oxygen pump and a filter respectively operatively connected between said withdrawing means and said returning means.

18. In a process for eliminating high boiling impurities during the separation of a gas mixture by rectification at low temperatures, which includes the steps of separating a compressed cooled gas mixture into (1) an impurity-free gaseous fraction which is rectified under a relatively high pressure and (2) a liquid fraction containing solid impurities which is expanded, filtered to remove impurities and rectified under a relatively low pressure, and a portion of the liquid higher boiling product produced in the last-named rectification is vaporized in a vaporizing operation to eliminate solid impurities therefrom and to form a residual liquid containing said impurities, the improvement which comprises at least intermittently recycling a selected portion of said residual liquid from said vaporizing operation under pressure through a filter medium, and returning the filtered liquid to said vaporizing operation.

EDWARD F. YENDALL.

REFERENCES CITED

The following references are of record in the file of this patent:

UNITED STATES PATENTS

| Number | Name | Date |
|---|---|---|
| 1,394,955 | Recklinhausen | Oct. 25, 1921 |
| 1,891,125 | Gessel | Dec. 13, 1932 |
| 2,060,940 | Kahle | Nov. 17, 1936 |
| 2,256,421 | Borchardt | Sept. 16, 1941 |
| 2,337,474 | Kornemann et al. | Dec. 21, 1943 |

FOREIGN PATENTS

| Number | Country | Date |
|---|---|---|
| 413,518 | Great Britain | July 19, 1934 |